Nov. 12, 1957     A. E. RUTTER     2,812,629
ANGLING DEVICE FOR MULTIPLE GANG DISK HARROWS
Original Filed Dec. 31, 1946     8 Sheets-Sheet 1

Inventor:
Alvah E. Rutter.
By Evans, Pond & Anderson
Attys

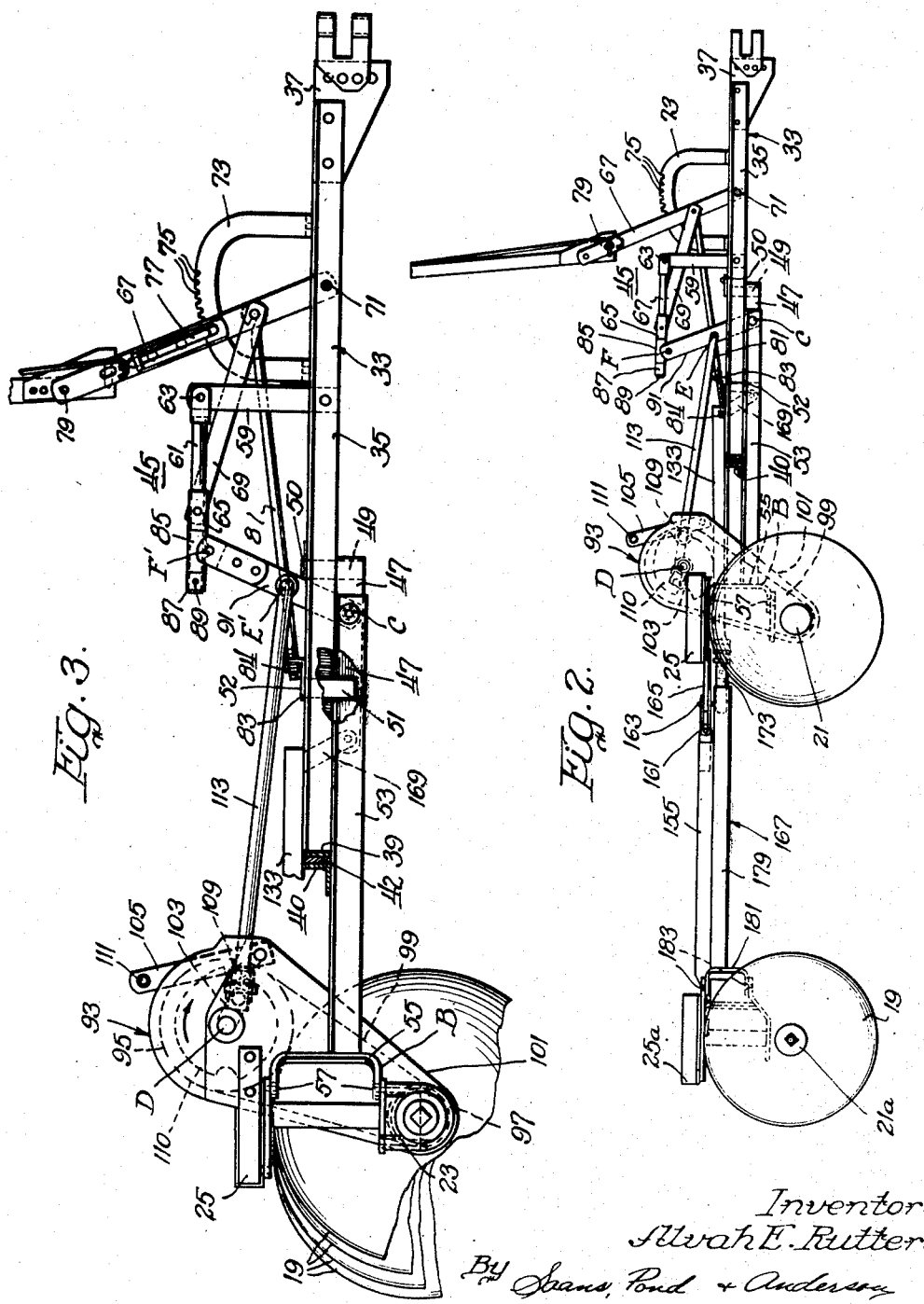

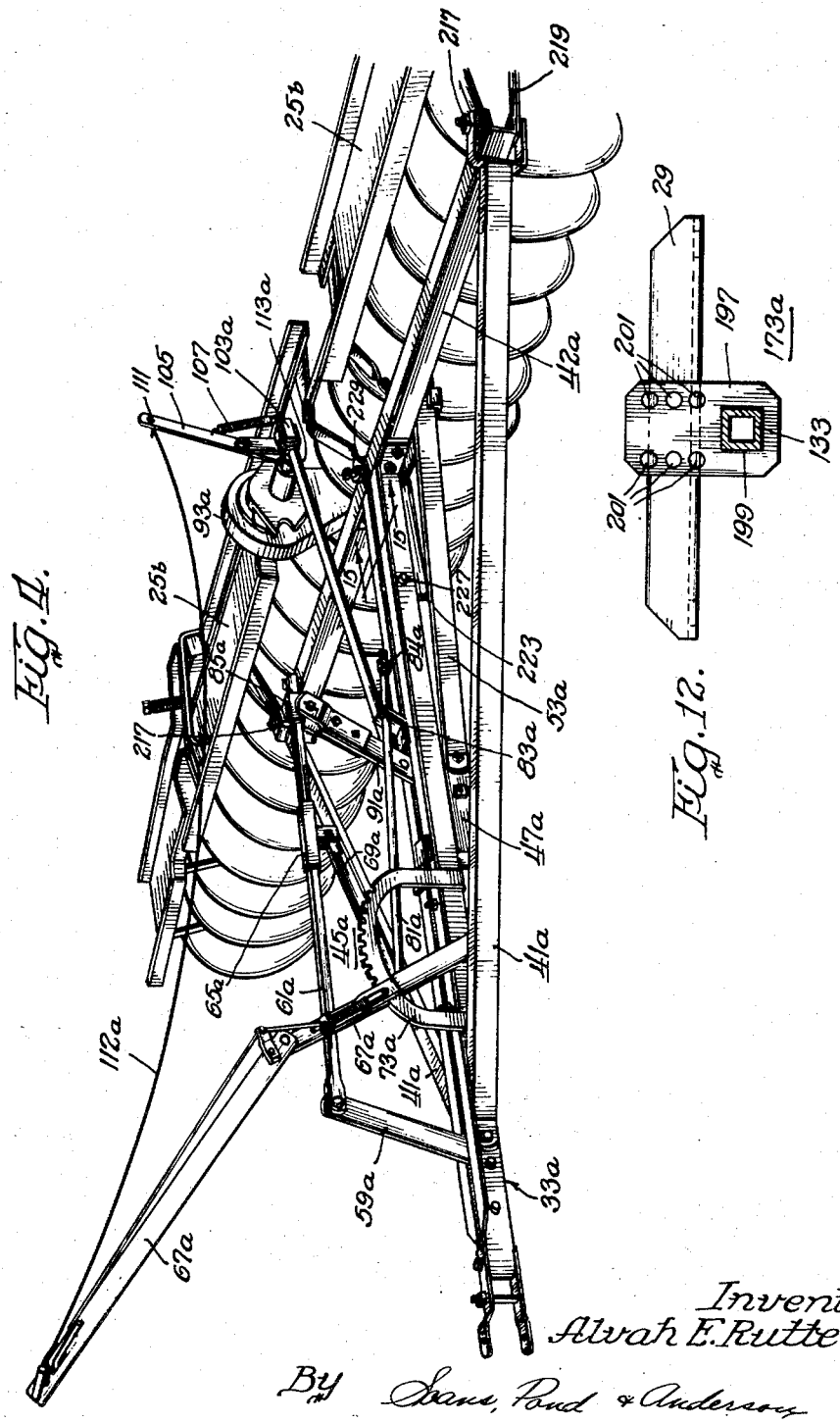

Nov. 12, 1957     A. E. RUTTER     2,812,629
ANGLING DEVICE FOR MULTIPLE GANG DISK HARROWS
Original Filed Dec. 31, 1946     8 Sheets-Sheet 4
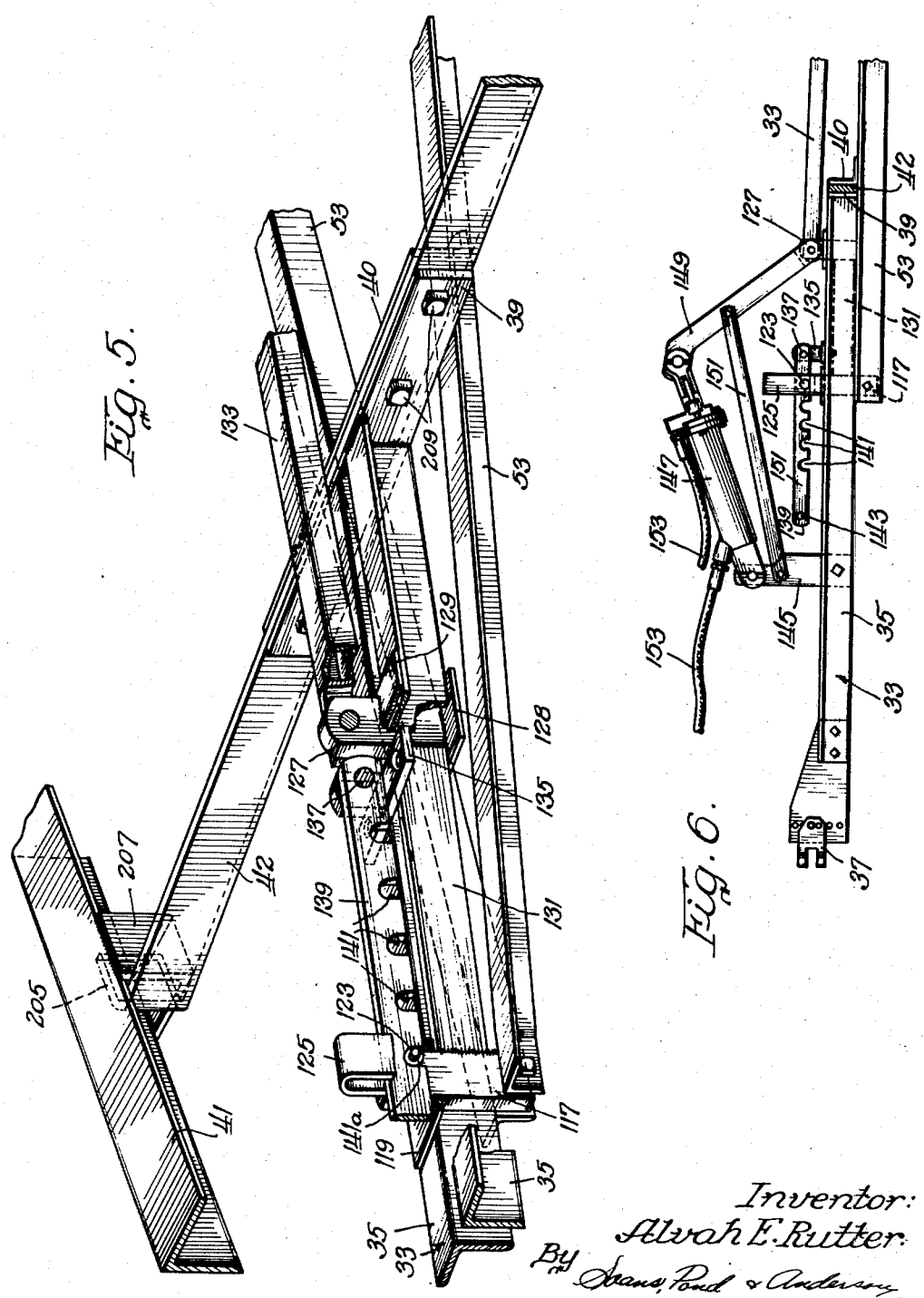
Inventor:
Alvah E. Rutter
By Evans, Pond & Anderson
Attys

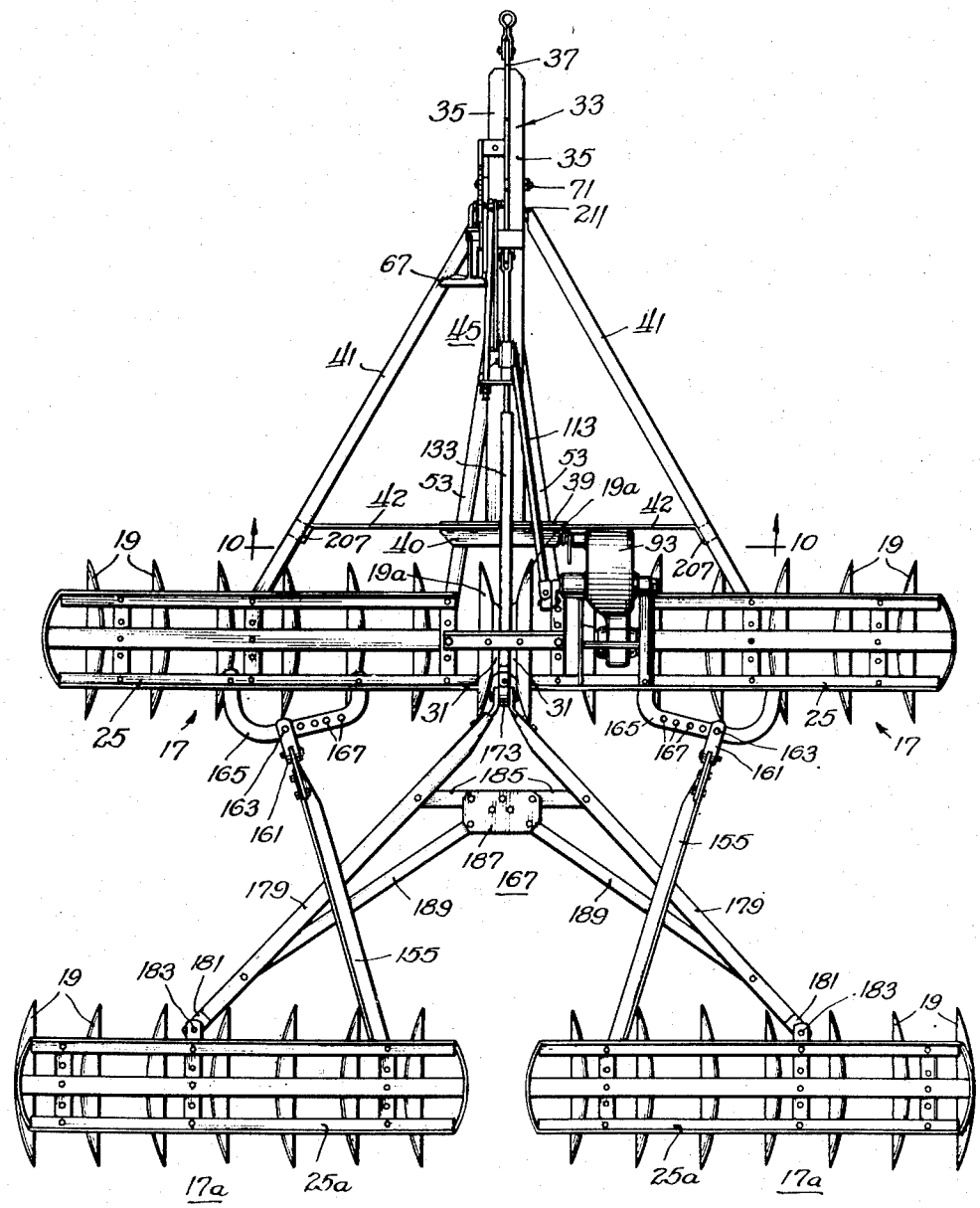

Nov. 12, 1957 A. E. RUTTER 2,812,629
ANGLING DEVICE FOR MULTIPLE GANG DISK HARROWS
Original Filed Dec. 31, 1946 8 Sheets-Sheet 6

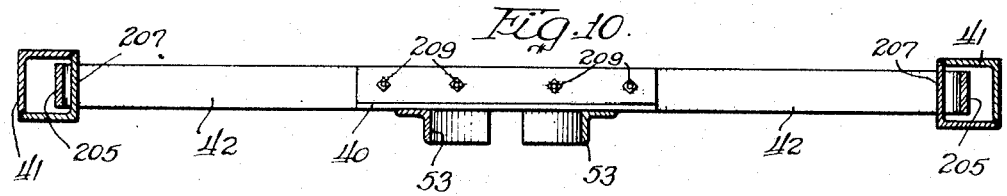
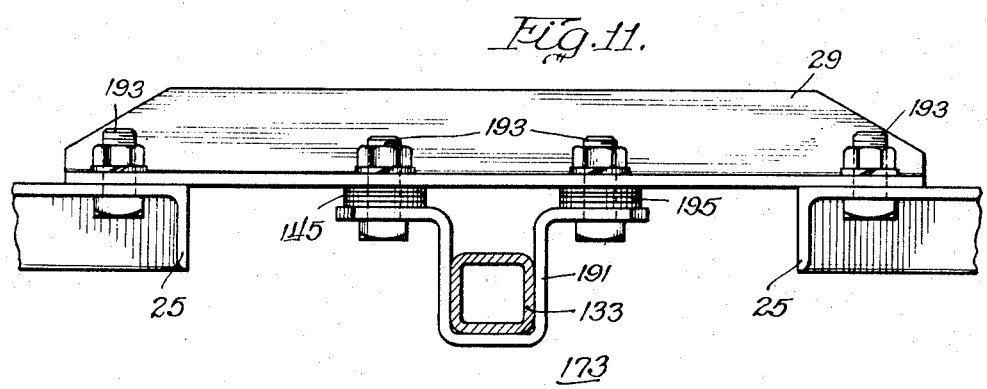
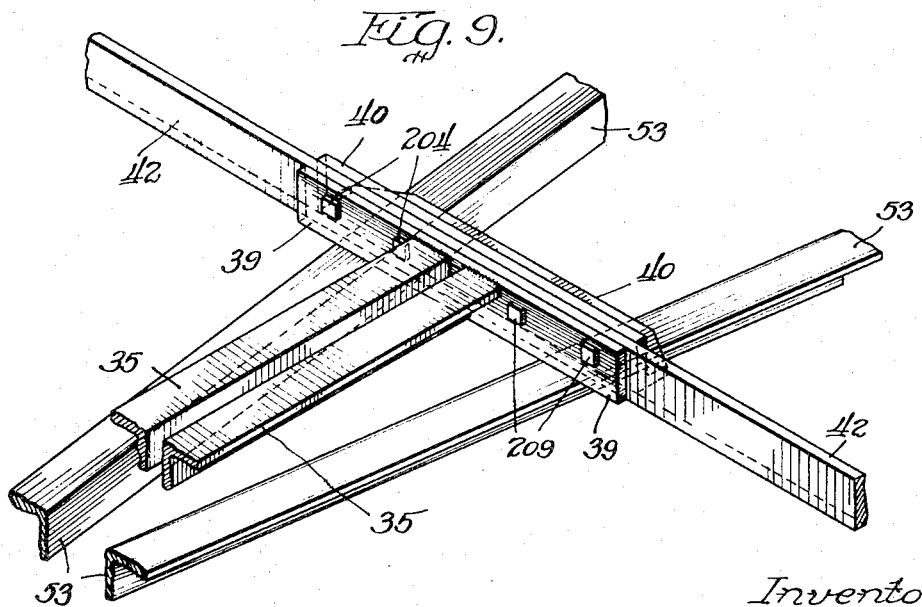

Nov. 12, 1957     A. E. RUTTER     2,812,629
ANGLING DEVICE FOR MULTIPLE GANG DISK HARROWS
Original Filed Dec. 31, 1946     8 Sheets-Sheet 8
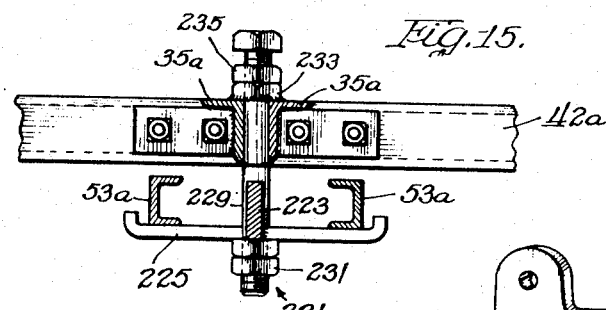
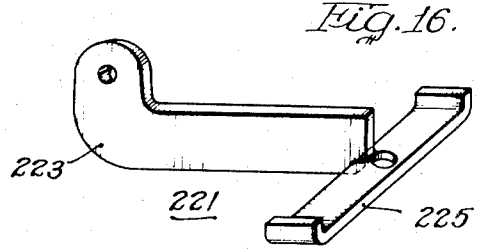
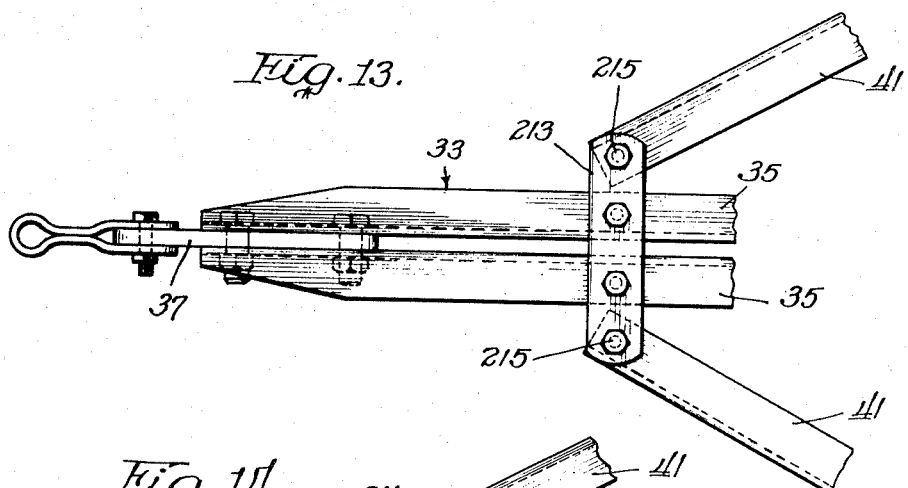
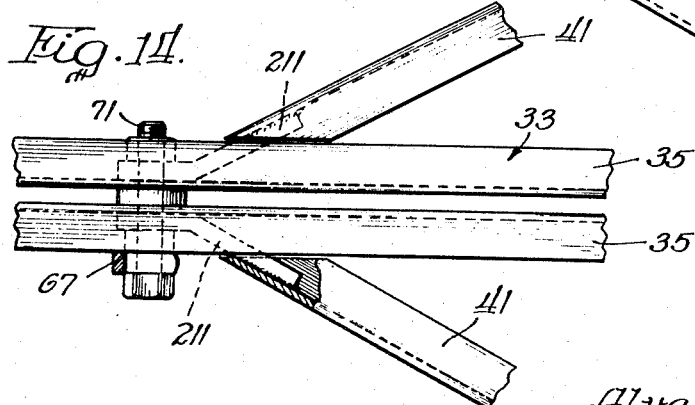
Inventor.
Alvah E. Rutter.
By Evans, Pond & Anderson
Attys.

United States Patent Office 2,812,629
Patented Nov. 12, 1957

2,812,629

ANGLING DEVICE FOR MULTIPLE GANG DISK HARROWS

Alvah E. Rutter, Rockford, Ill., assignor to J. I. Case Company, Racine, Wis., a corporation of Wisconsin Original application December 31, 1946, Serial No. 719,505, now Patent No. 2,663,132, dated December 22, 1953. Divided and this application June 26, 1953, Serial No. 364,740

7 Claims. (Cl. 55—83)

The present invention relates to harrow constructions, and, more particularly, to improved disc harrow constructions.

The principal objects of the invention are the provision of an improved tandem harrow structure with means for adjusting the draft and angularity of the rear gangs; the provision of an improved harrow frame structure; and the provision of means for simultaneously angling the forward and rear harrow sections of a tandem type harrow. The attainment of the above objects effects an increase in the general efficiency of operation of multiple harrows, it includes the improving of the mechanical connecting linkages so as to effect more uniform tilling of the soil being harrowed; and it makes possible decreased wear on the moving parts of the harrow, and thus decreasing the cost of maintaining these implements in operating condition. Other objects and advantages of the invention will be apparent from reference to the following description and the accompanying drawings which illustrate preferred embodiments of the improved construction.

In the drawings,

Fig. 2 is a side elevational view of the harrow illustrated in Fig. 1;

Fig. 3 is a fragmentary, enlarged, elevational view similar to Fig. 2, showing the position of the control linkage illustrated in the preceding figures, with the harrow gangs in the angled position;

Fig. 4 is a fragmentary, perspective view of a "wide type" harrow embodying a modified control linkage which has an action similar to that of the control linkage shown on the harrow illustrated in Fig. 1;

Fig. 5 is a fragmentary, perspective view, partially in section, of a simplified control linkage in accordance with the invention adapted for use on the harrow illustrated in Figs. 1 and 3;

Fig. 6 is an elevational view showing the linkage illustrated in Fig. 5 adapted for use with a hydraulic control cylinder;

Fig. 7 is a plan view of the tandem harrow illustrated in Fig. 1, with the gangs in the "straight" position;

Fig. 9 is a fragmentary, perspective view of the leveling bar connections forming a part of the harrow illustrated in Fig. 1;

Fig. 10 is a sectional view of a spreader bar construction, taken on line 10—10 in Fig. 7;

Fig. 11 is a sectional view of one type of leveling adjustment, taken on line 11—11 in Fig. 1;

Fig. 12 illustrates a modification of the device shown in Fig. 11;

Fig. 13 is a plan view of a main frame connection which may be used on the harrows illustrated in the other figures of the drawings;

Fig. 14 is a plan view of an alternate main frame connection which may be used in the harrows illustrated in the other figures of the drawings;

Fig. 15 is a sectional view taken on line 15—15 in Fig. 4; and

Fig. 16 is a perspective view of the leveling yoke 221 illustrated in Fig. 15.

Figure 1:
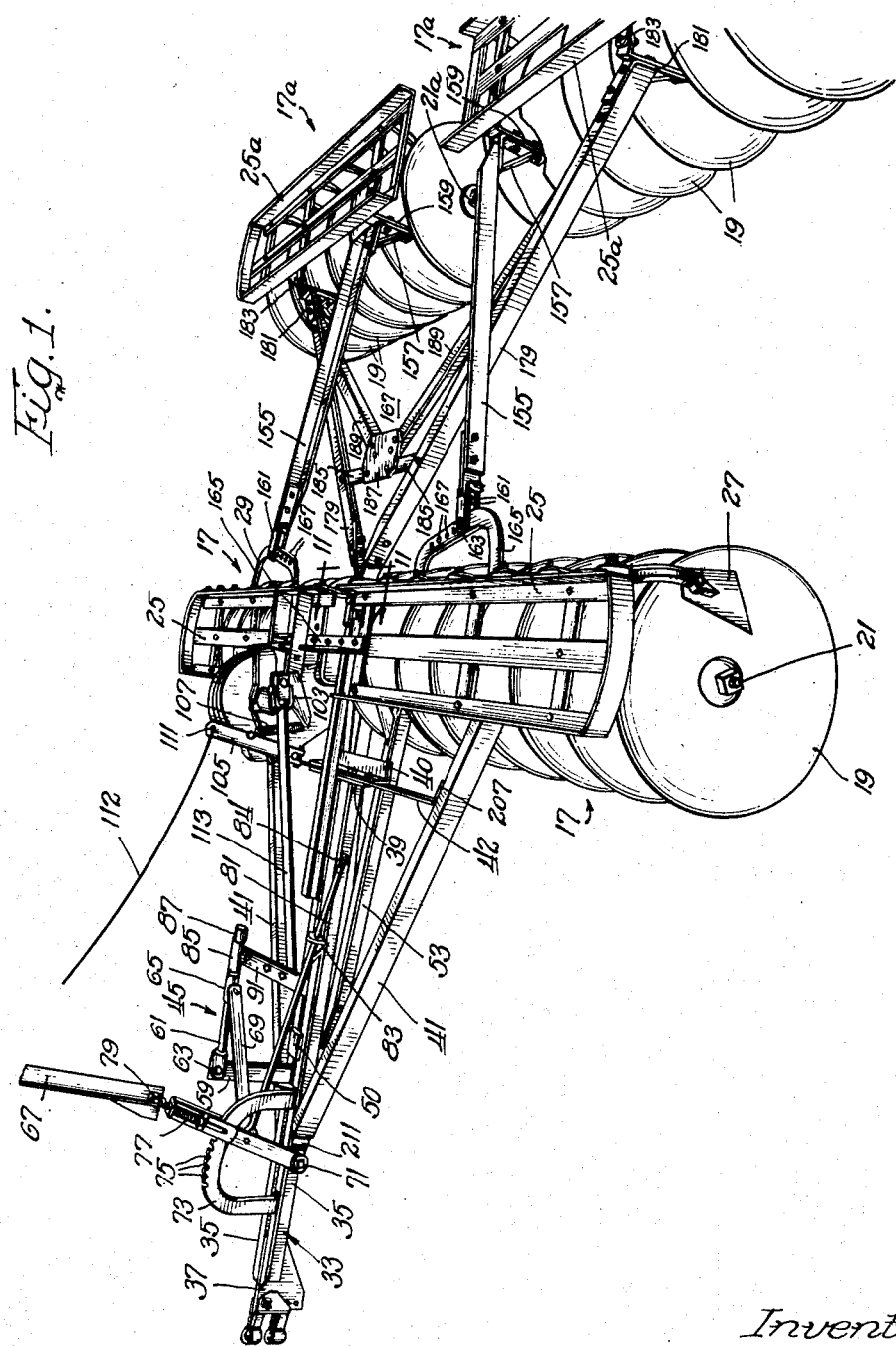
Fig. 1 is a fragmentary, perspective view of a tandem harrow embodying the features of the invention and having its sections or gangs in the parallel or "straight" position.
Figure 8:
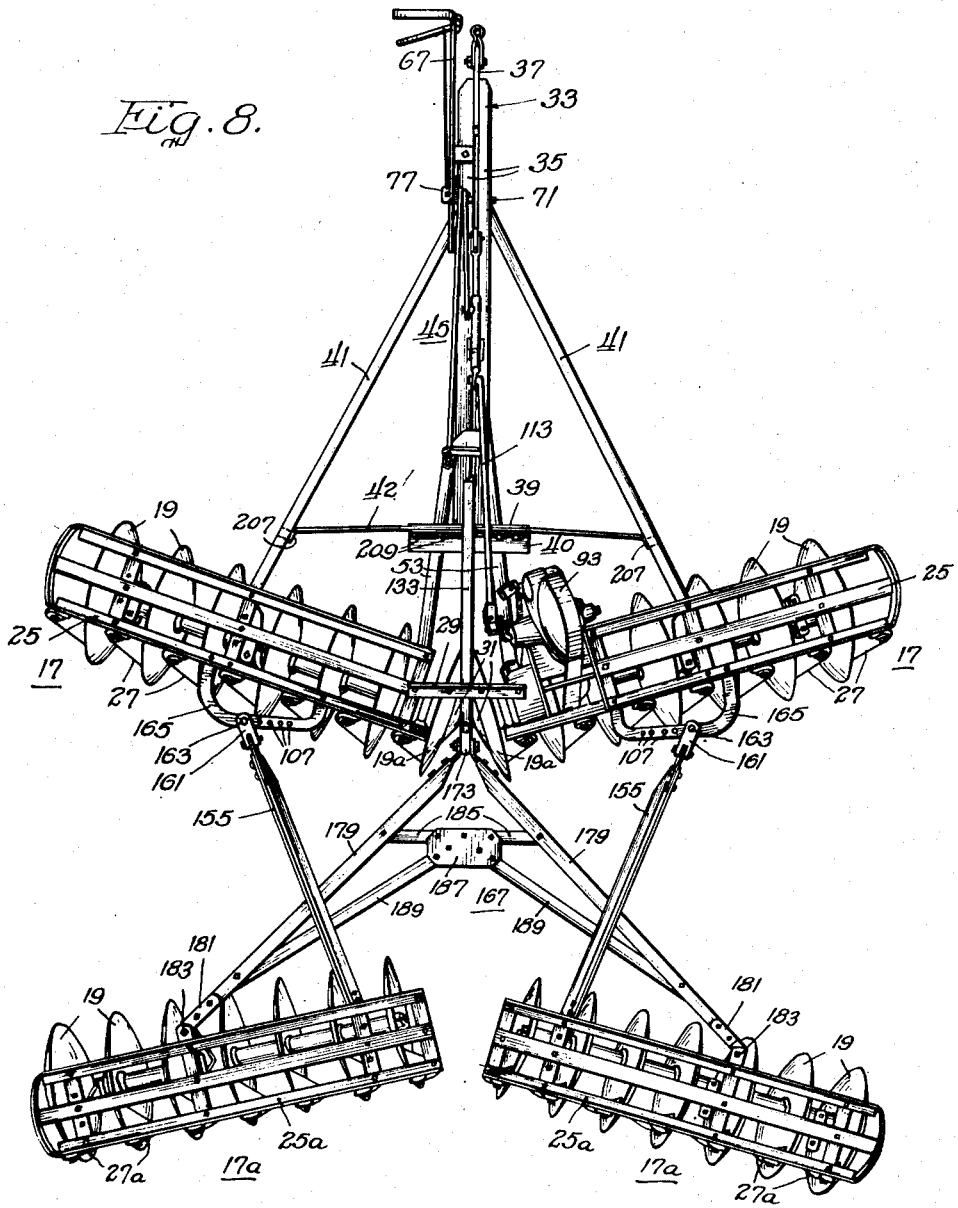
Fig. 8 is a plan view similar to Fig. 7 showing the gangs in the angled position.

An improved power-operated control and adjusting means for a multiple gang harrow is provided by a control linkage embodying the various structural combinations and features illustrated particularly in Figs. 1, 2, and 3. The arrangement to be first described is concerned with adjusting and controlling the angularity of the pair of forward gangs. The adjustable control linkage and frame members connecting the rear harrow gangs with the forward harrow gangs and with the forward gang control mechanism, will be fully described in a subsequent paragraph.

A typical multiple gang disc harrow, as illustrated, usually comprises four or more harrow gangs 17 adapted to be drawn by a tractor or other draft means in a balanced arrangement. Each harrow gang 17 comprises a plurality of sharp discs 19 which are attached to a shaft 21 journalled into suitable bearings 23 supported on a frame 25. Each of the discs 19 is desirably provided with a scraper blade 27 which may be pressed against the discs 19 by a spring, in order to remove any earth that may adhere to the disc during operation. The frames 25 of the forward gangs are loosely joined together by means of a hingedly attached connecting link 29 which allows relative movement between the frames 25. The inner discs 19a adjacent the connecting link 29 are each provided with a cast-iron, or other suitable bumper 31, which is adapted to provide a rolling contact for the harrow sections 17 during operation, and to protect the discs when the end thrust of the gangs causes the center discs to "ride up" on each other.

The draft frame arrangement provided, comprises a rigid tongue 33 which is fabricated from a pair of suitable spaced-apart angle sections 35. The angle sections 35 are spaced at the forward end by a hitching plate 37 which is adapted to be connected to the draft vehicle. The angles 35 are joined at their rear end to a horizontally extending cross plate 39 to which is attached a leveling plate 40 and a spreader bar 42, at an angle normal to the tongue 33. Draft members 41 are attached to the forward portion of the tongue 33 closely adjacent the hitching plate 37 and extend rearwardly to a yoke, which is pivotally connected to the outer section of the harrow gang frame 25. The ends of the spreader bar 42 are attached to the draft member 41 so as to form a rigid A frame having the tongue 33 as an added reinforcing member extending through the apex of the A to the cross plate 39 to which the center of the spacer bar 42 is attached. This description of the draft frame is merely intended to supply a background for the following description of the control linkage 45. An improved draft frame construction will be fully described in a subsequent paragraph.

The connection between the inner end of the harrow gang frames 25 and the draft frame includes a sliding saddle member 47 which is supported under the tongue 33 of the draft frame by a pair of vertically disposed connecting members 49 and 51, which extend upwardly through the slot defined by the spaced-apart angle members 35 comprising the tongue 33. The vertical connecting members 49 and 51 are supported upon cross members 50 and 52 which permit slidable movement of the saddle 47 along the slot defined in the tongue 33. Rigid control bars 53 connect the saddle and a yoke 55 connected to the inner section of each of the forward harrow gang frames 25 by vertically extending hinge pins 57.

The adjusting or control linkage 45 includes a generally vertical standard 59 which is rigidly joined to the tongue structure 33, forward of the most forwardly position occupied by the sliding saddle 47 when the harrow gangs 17 are in the "straight" position. A generally horizontal, rearwardly extending guide rod 61 is hingedly connected to the upper end of the vertical standard 59 by means of a transversely disposed hinge pin 63. A stop sleeve 65 is slidably supported upon the guide rod 61, and this sleeve is operatively connected to an angle selector lever 67 by a rigid adjusting rod 69. The angle selector lever 67 is of conventional design and comprises a rigid structural member hingedly connected to the tongue 33 by means of the pin or bolt 71. The position of the angle selector lever 67 is maintained by a quadrant 73, which is divided into a plurality of spaced-apart limiting notches 75. The selector lever 67 is provided with a spring lock 77 for positively engaging it in any one of the limiting notches 75 on the surface of the quadrant 73. A hinged connection 79 in the angle selector lever 67 is provided to allow the lever to extend within reach of the tractor operator. A limiting rod 81 is also pivotally connected to the adjusting lever 67 and extends rearwardly to be slidably received in an opening provided in a bracket 83 rigidly attached to the cross member 52 which is a part of the sliding saddle 47. One or more stop nuts 84 on the threaded end of the rod 81 afford an adjustment of the amount of relative movement provided between the rod 81 and the bracket 83. This limiting rod 81 determines the intermediate positions that are taken by the harrow gangs 17 when the adjusting mechanism 45 is used.

An adjusting sleeve 85 is slidably supported upon the guide rod 61 rearwardly of the stop sleeve 65, and is limited in its rearward movement by a stop collar 87 which is rigidly attached to the guide rod 61 by means of a pin or bolt 89. A rigid pivot bar 91 is hingedly connected between the adjusting sleeve 85 on the guide rod 61 and the sliding saddle 47, which has been previously described.

The source of power for the angling mechanism is a cyclic clutch 93 which is supported upon the frame 25 of the right hand forward harrow gang. A clutch sprocket 95 is operatively connected to a sprocket 97 on the gang shaft by means of a chain 99 enclosed by a suitable guard 101. The clutch 93 is of the type generally used in the implement art, and needs little detailed description. The clutch 93 is adapted to rotate an external crank 103, 180 degrees when ever a release lever 105 is pulled. The release lever 105 is biased by the action of a spring 107 and is provided with a suitable roller 109 which is adapted to lock a clutch detent in place after the clutch plate 110 rotates 180 degrees. The release lever 105 is provided with a hole 111 to which may be attached a rope 112 extending to a position adjacent the operator's position on the tractor or other draft vehicle. The crank 103 on the clutch 93 is operatively connected to one end of a pitman 113, whose other end is hingedly connected to the pivot bar 91, intermediate the adjusting sleeve 85 and the sliding saddle 47.

When the harrow is being pulled to the field for use it is necessary that the gangs 17 be parallel or "straight" so that the implement requires less motive power and does not excessively damage the roads. Movement to the "straight" position is effected by pulling the release lever 105 when the harrow is being pulled forward, the cyclic clutch 93 then operating to rotate the crank 103 to the rear position. When the crank 103 moves to the rearward position, the control linkage 45 operates to lock the harrow gangs in the "straight" position (Fig. 2).

When it is desired to shift the harrow gangs 17 into the angled or working position (Fig. 3) the operator has but to again trip the clutch 93. In order to understand the positive movement that occurs when the clutch 93 is tripped and the crank 103 moves the pitman 113 forward, it is desirable to resolve the various members into their component, geometric relations. The control structure 45 is substantially rigid in a transverse plane, so that any such movement may be disregarded. In an elevational plane, and referring particularly to Fig. 2, we may consider the basic geometric figure of the linkage as a quadrilateral having a base BC of a fixed length (the control bars 53), the ends BD and CE being fixed lengths (the frame elevation and the pivot bar 91), and the fourth side, DE being of a variable length, the variation being equal to twice the throw of the clutch crank 103. Because the yoke 55 connecting the control bars 53 to the frame 25 only allows hinged movement in the transverse direction, the angle CBD is a fixed angle determined by the frame 25 of the harrow gang. Thus, in effect, the structure resolves itself into the triangle CDE, having the side DE, a variable length.

When the clutch 93 is tripped during the angling operation, the crank 103 moves forward and increases the length of side DE, and moves the rigid extension EF of side CE into the position E'F' shown in Fig. 3. As points F and F' are both on the adjusting sleeve 85, the sleeve will move along the guide rod 61 as far forward as the stop sleeve 65, whereupon further movement forces the base BC (the control bars 53) to the rear and angles the harrows.

In order to obtain various angles of the harrows with a constant throw crank 103, the adjusting stop sleeve 65 may be moved forward along the guide rod 61 by the action of the angle selector lever 67 and the adjusting rod 69. The increased free length along the guide rod 61 absorbs a predetermined part of the forward movement of the pivot bar 91 and, therefore, makes possible a controlled decrease in the relative angling of the harrows. As the harrow is pulled forward, the sliding saddle 47 moves rearwardly in the tongue until stop nuts 84 on the limiting rod engage the bracket 83 on the saddle 47 and prevent any further movement. It is seen that the relative angle is maintained by the limiting rod 81, whose position is, in turn, controlled by the position of the angle selector lever 67 in the limiting notches 75 on the quadrant 73.

If the clutch 93 is tripped when the harrows are in the angled position, the quadrilateral is restored to its original form by rotation of the crank 103, and the harrow gangs 17 are brought to the "straight" position, regardless of the position of the selector lever 67 on the quadrant 73. The draft force exerted on the inner gang frame sections when the harrow is in the "straight" position is transmitted to the tongue 33 at the forward end of the draft frame, through the stop collar 87, the guide rod 61, and the vertical standard 59. When the harrow is in the full or maximum angled position, the draft force applied to the inner portion of the harrow sections 17 is transmitted from the tongue 33 through the vertical standard 59, the guide rod 61, the stop collar 87, the pivot bar 91, the saddle 47, and the control bars 53. The entire assemblage is rigid due to the locking action of the pitman 113. At all positions intermediate the full angled position and the "straight" position of the harrow sections, the draft force is transmitted to the harrow sections by the angle selector bar 67, and the bracket 83 on the saddle 47, which bracket bears on the stop units 84 at the end of the limiting rod 81.

It is apparent that the adjusting and control means provided by the structure described, will permit widely varying angle adjustments of the harrow sections at any time during operation of the implement. The tractor need not be stopped in order to change the angularity of the discs, and while it is possible to forcibly adjust the harrow sections by movement of the selector lever 67, the apparatus makes possible power-operated automatic adjustment of the sections. When it is desired to adjust automatically the angularity of the harrow sections, the clutch is tripped and the harrows are moved to the "straight" position, whereupon the selector lever 67 is set in the desired limiting notch on the quadrant 73 and the clutch is again tripped to effect the movement of the gangs into the desired position. This automatic adjustment of the harrow sections is very desirable in a harrow which is used under widely varying soil conditions such as are encountered in rolling farm land during the planting season.

The control linkage 45a on the "wide type" harrow illustrated in Fig. 4, is a modification of the control linkage 45 that has been described in the foregoing. As the "wide type" harrow has a greater reactive force at the center of the gangs than is encountered on the other standard types of harrows, the linkage 45a is made stronger and the vertical standard 59a is moved forward of the quadrant 73a and angle selector lever 67a so as to improve the stress characteristics of the structure. The position of the connection between the pivot bar 91a, which connects the sliding saddle 47a, the adjusting sleeve 85a on the guide rod 61a, and the pitman rod 113a is lowered to a point almost in contact with the upper surface of the tongue 33a, so as to provide the added travel needed to angle the wide sections.

As illustrated in Figure 4, the control linkage 45a and the harrow sections are in the "straight" position and are held in that position by the reaction force transmitted through the pitman 113a. To effect automatic angling of the harrow sections to a position determined by the setting of the selector lever 67a, the trip rope 112a is pulled forward to actuate the cyclic clutch 93a. Rotation of the clutch crank 103a and the pitman 113a moves the pivot bar 91a along the guide 61a until it reaches the stop sleeve 65a, which is connected to selector lever 67a by the link 69a. Further movement of the crank and pitman moves the saddle 47a and thereby moves the central portion of the harrow sections rearward until the saddle bracket 83a engages the stop nuts 84a on the end of the limiting rod 81a. The pivot points and the lengths of the various cooperating members are so correlated that the saddle bracket 83a engages the stop nuts in the various adjustment positions. In this connection, it should be noted that the forward position of the selector lever 67a, illustrated in Fig. 4, permits some angling of the harrow sections.

A simplified adjusting mechanism in accordance with the invention, is illustrated in Fig. 5. The A-shaped draft structure, the leveling plate 40, the spreader bar 42, and the other elements of the harrow may be identical with the structures previously described. The rigid control bars 53 are attached to the forward end of a sliding assembly 131, disposed in the slot formed by the spaced-apart angle members 35 which constitute the tongue 33. Vertically extending webs 117 and 127 which constitute a part of the assembly 131 extend above the surface of the tongue 33 at the forward and rear ends, respectively, of the sliding assembly 131. The assembly 131 is supported by a pair of transversely extending bearing plates 119 and 129. A lower bearing plate 128 is provided to hold the rear portion of the assembly 131 in place while the central bars 53 hold the forward end in position. A stud 123 and a U-shaped strap 125 are attached to the forward upstanding web 117, as illustrated, and cooperated to form a guideway. The rear web 127, extends upward and is adapted to be connected to the rear gang tongue 133. Thus, there is formed a sliding assembly which is generally similar to the saddle arrangement described in conjunction with the power controlled cyclic clutch angling mechanism. A permanent stop 135 is attached to the upper surface of the tongue 33, and to this is pivotally attached, by means of a transversely extending pin 137, a locking bar 139 having a plurality of stop notches 141. The stop notches 141 are proportioned to engage the outer surface of the stud or pin 123, and the dimensions of the locking bar 139 are so proportioned that it slides freely in the guideway provided by the strap 125. The free end of the locking bar is provided with a hole 143 (Fig. 6) to which may be attached a rope leading to the operator's seat on the tractor.

In order to angle the harrows, the operator has but to lift the locking bar 139 to the upper position in the saddle 125, slowly move the tractor forward, which movement causes the resistance of the center of the harrow gangs to move the control bars 53 and, therefore, the sliding assembly, to the rear. When the desired position is reached, the operator releases the locking bar 139, so that the adjacent stop notch 141 engages the shoulder bolt 123, and locks the harrow sections in the desired position. To move the harrows into the "straight" position, the operator lifts the locking bar 139, backs the tractor until the sliding assembly reaches the maximum limit of forward travel, and then drops the locking bar so that the last notch 141a engages the shoulder screw 123.

The angle control arrangement just described may be conveniently converted to a hydraulic powered mechanism (Fig. 6) by bolting a bracket 145 to the tongue 33 in the vicinity of the hitching plate 37 and attaching one end of a hydraulic piston and cylinder unit 147 to this bracket 145. The other end of the hydraulic unit 147 is connected to the web 127, which is adapted to also connect with the rear harrow gang tongue 133. Because of the construction of the linkage a pivot bar 149 or other elevating means is connected between the hydraulic unit 147 and the web 127 substantially as illustrated in Fig. 6. A rigid member 151 is pivotally connected between the pivot arm 149, intermediate its ends, and a fixed point on the frame, for example, the bracket 145 provided for the hydraulic cylinder 147. The hydraulic unit 147 is connected to a source of pressure fluid, as for example a pump located on the draft vehicle, by suitable flexible conduits 153.

In order to change the angle of the harrow sections the operator raises the locking bar 139, starts the hydraulic pump, adjusts the flow of fluid so as to move the harrows into the proper position, and then locks the sections in place with the locking bar 139 as described previously. On some types of hydraulic installations on tractors, pressure can be consistently maintained at the desired level and in this instance it will be possible to dispense with the locking bar arrangement. As many of the modern tractors are provided with hydraulic pressure systems, the adjusting means herein described will provide an inexpensive and efficient mechanism for many implements.

The improved angle control and rear gang adjusting means of the invention is accomplished by means of the novel structural arrangements that are shown, particularly in Figs. 2, 3, 7, and 8. The rear gangs 17a each include a frame 25a which supports bearings in which there is journalled a disc supporting shaft 21a; a plurality of harrow discs 19 are attached to each shaft 21a and each disc is desirably provided with a scraper blade 27a, as shown in the structure illustrated. The inner end of each rear gang frame 25a is connected to the corresponding forward gang 25 by means of a pull bar 155, which is attached to a yoke 157 (Fig. 1) pivotally connected to the rear gang frame 25a by vertically extending pins 159. The forward end of each of the pull bars 155 is connected by means of a shackle 161 and a vertically extending pin 163, to a draft yoke which is attached to the rear edge of the corresponding forward gang frame 25 at a point inside and closely adjacent to a line extended parallel to the direction of draft and passing through the junction of the forward frame 25 and the forward draft members 41.

The draft yokes 165 are fabricated from strip material, which is shaped as shown in the drawings. The rear outer end of each of the yokes 165 is desirably more remote from the associated gang frame 25 than the inner end. A series of spaced-apart holes 167 are punched or drilled along the length of each of the draft yokes 165 in order to provide a bearing surface for the shackle pin 163 which connects that yoke 165 to its pull bar 155.

The main draft means for the rear section 17a comprises an A frame 167, which is connected at its forward end to the rear gang tongue 133, which in turn connects to the sliding saddle 47 constituting a part of the forward gang angling control linkage 45. This connection may be made either directly to the saddle 47, or it may be made on top of the forward gang tongue 33 by means of a connecting web or lug 169, as shown Figs. 2 and 3.

The rear gang tongue 133 extends rearwardly from the saddle 47, and passes through a vertical adjusting plate 171 which is supported upon the connecting link 29 joining the pair of forward gangs 17. The tongue 133 is connected to the apex of the rear gang A frame 167 by a universal joint 173 which permits the A frame to move freely during use of the implement. The side members 179 of the A frame 167 extend rearwardly from the universal joint 173, to a yoke 181 which is pivotally attached by means of a vertically extending hinge pin 183 to the outer portion of each of the rear gang frames 25a. The side members 179 pass under the pull bars 155 as shown in the drawings, in order to provide leveling for the rear harrow sections 17a as will be hereinafter described.

The rear A frame 167 is reinforced by a spreader bar 185 which supports a gusset plate 187, to which are attached reinforcing members 189. The reinforcing members extend from the gusset plate 187 to a point forward of the yokes 181, where they are rigidly attached to the side members 179. The frame 167 thus constitutes a rigid structure which resists stresses tending either to spread or collapse the ends of the side members 179.

In operation, the rear harrow sections 17a are angled simultaneously with the forward harrow sections 17 and employ the same angling controlling methods as have been disclosed in the preceding description of the angling control linkages. The rear gang tongue 133 is connected to the sliding saddle 47, as has been previously described. When the release lever 105 on the cyclic clutch is tripped, the saddle 47 slides to the rear, in response to the movement of the clutch crank 103 as modified by the control linkage 45. The rear frame 167 which is connected to the sliding saddle 47 by the tongue 133 is moved rearwardly and forces back the outer ends of the rear harrow sections 17a. The position of the inner ends of the rear harrow sections 17a has been substantially unchanged because they are connected by the pull bars 155 to pivot points closely adjacent the connections between the draw members 41 and the forward gang frame 25. Thus, the rear gangs 17a are angled in a direction opposite to that of the forward gangs 17 about axes located at the connections between the rear gang 17a and the pull bar 155.

As the rear gangs are pulled along the field, the outward thrust caused by the reaction of the discs 19 against the soil, is neutralized in large part by the reinforcing members 189 and the spreader bar 185. If it is desired to angle the rear harrow sections 17a, a different amount than the angle assumed by the forward harrow section 17, the adjustment may be accomplished by placing the vertical bolt 163 of the pull bar shackles 161 in another hole in the draft yoke 165. Because of the shape and the position in which the perforated draft yoke 165 is disposed, it has more effect on the angle of the rear harrow sections 17a when the forward harrow sections 17 are angled than when they are parallel. The auxiliary adjustment provided by the draft yoke 165, thus has little effect when the harrows are "straight" and the rear harrows will always remain substantially parallel with the forward harrows when the latter are in line regardless of the position of the pull bar shackle 161 on the draft yoke 165.

Level operation of the gang harrows is desirable at all times, in order to effect uniform working of the soil. This quality of level operation has been one of the serious deficiencies in most of the prior art devices. In the present construction, level operation of the rear harrows is insured by the provision of means for applying a positive downward force to the outer ends of the rear harrow sections during use. This means which is indicated generally at 173 operates by elevating the rear gang tongue 133 so as to raise the apex of the rear A frame 167 with respect to the rear pull bars 155. The elevating means may comprise an adjustable strap 191 as illustrated in Fig. 11 or an adjustable plate 197 as illustrated in Fig. 12.

The U-shaped strap 191 is attached to the link 29 which connects the forward harrow sections by a pair of bolts 193 and is spaced from the link 29 by means of a plurality of washers 195. The tongue 133, without the support of the U-shaped strap 191, would allow the rear frame 167 to fall away from the pull bars 155. Vertical height adjustment of the tongue 133 is accomplished by increasing or decreasing the number of washers 195 which vertically space the tongue from the connecting link 29. When the tongue 133 is raised, the adjusting frame 167 is also raised; thus, the side and reinforcing members, 179 and 189, then bear against the pull bars 155 which, in turn, overcome the upward reaction on the outer end of the rear harrow sections. Once adjusted as to height, the side members 179 act as levers and use the pull bar 155 as a fulcrum to keep the outer ends of the rear gangs in proper position despite the upward reaction caused by the passage of the harrow discs through the soil.

A similar, but modified, vertical adjustment is illustrated in Fig. 12. The vertical adjustment 173a shown in this drawing employs a plate 197 having a hole 199 therein, which is adapted to form a guide for the rear gang tongue 133. A series of graduated, vertically spaced-apart holes 201 are provided, whereby the vertical adjusting plate 197 can be bolted to the connecting link 29 at various heights. The leveling action of this adjusting plate is similar to the action of the U strap adjusting means 173 previously described, but has the added advantage of aiding the forward gang leveling plate in keeping the forward gangs from "riding" over one another.

The provision of an improved A type draft frame for the forward harrow gangs, which is one of the objects of the invention, is accomplished by means of the novel structural combinations illustrated in Figs. 5, 9, 10, and 13.

In general, as previously stated, the draw frame includes a tongue 33 comprising a pair of spaced-apart angle sections 35 which define a slot within which slides the saddle 47 or the sliding assembly 131, for angling the harrow sections. A pair of draw members 41 extend rearwardly and outwardly from the forward portion of the tongue 33. The draw members 41 are connected to the draw yokes provided on the outer portions of the harrow frames 25, and a spreader bar 42 and leveling plate 40 maintain the draft members 41 in their respective positions. As there is a relatively large inward thrust acting upon the draft frame when the harrow sections are angled, the forward harrow gangs 17, during the operation of the implement, are biased toward each other with considerable force. At the same time, it is essential that the sections be capable of moving up and down relatively independently of each other to accommodate the harrow to normal unevenness of the ground.

To facilitate the accomplishment of this action, the improved frame of the invention includes a resilient spreader bar 42, which, as illustrated, may be of rectangular cross section with the major axis of the section disposed in a vertical plane. The bar 42 may be made of either spring steel or material which will act as a spring. The ends of the bar 42 are partially folded back to form bearing portions 205 which conform to the angle assumed by the draft members 41. The length of the spreader bar 42 is equal to the base of the triangle formed by the draft members 41 and which has as its altitude the forward gang tongue 33. The bearing portions 205 are adapted to slip into guide brackets 207, rigidly attached to the draft members 41 (Figs. 5 and 10), so as to provide floating connections between the ends of the spreader bar and the sides of the A frame.

The center of the spreader bar 42 is attached to a transversely extending cross member 39 which is integrally attached to the angle sections 35 comprising the tongue 33. The spreader bar 42 is held in place on the cross member 39 by bolts 209, which also hold the leveling plate 40 in position on the rear surface of the spreader bar 42. The leveling plate 40 comprises a relatively short angle section which is disposed at an angle normal to that of the tongue 33. One of the flat sides of the leveling plate 40 is disposed downwardly so as to form a satisfactory bearing surface for the control rods 53 (Figs. 5 and 9). The leveling plate 40 also serves as a brace for stiffening the spreader bar 42, and, thus, provides a convenient means for determining the outward force on the harrow sections.

During operation of the harrow the spreader bar 42 bows when the harrows are in the angled position (Fig. 8) because of the inward thrust resulting from the reaction of the harrow discs in the earth. The bearing sections 205, at the ends of the spreader bar 42, bear against the draft members 41 and tend to force the members outwardly and, thus, substantially reduce the forces that are impressed upon the central disc bumpers 31. Because the bearing sections 205 of the spreader bar 42 fit loosely in the guide brackets 207, free movement of the draft members 41 is possible in a horizontal plane, but it is slightly restricted in a vertical direction.

The under surface of the leveling plate 40 exerts a downward force upon the control bars 53, which, in turn, exert a downward force upon the inner section of the forward gangs 17; this force helps maintain the forward gangs 17 in a common plane. Thus, by the use of the spreader bar 42 and leveling plate 40, the downward force of the weight of the tongue 33, the draft frame and the harrow gangs themselves aids in keeping the harrow in a level position.

When using a flexible spreader bar 42, in accordance with the invention, it is desirable to provide a hinged connection between the forward ends of the draft members 41 and the tongue 33, to reduce the possibility of fatigue failure. This hinged connection may be provided by the insertion of a spring steel strap member 211 (Fig. 14) between the tongue 33 and the draft member 41. In connecting the straps 211 to the tongue 33, it is convenient to use the selector lever pivot bolt 71 as the means for making the connection. A modified, hinged connection (Fig. 13) comprises a transversely extending cross bar 213 attached to the tongue 33, and to which, at each end, the draft members are mechanically connected by means of vertically extending hinge pins 215. In both of the arrangements described, substantially all of the force of the ground reaction of the gangs is absorbed by the spreader bar instead of exerting excessive stresses upon the connections between the frame members or on the bumper 31 intermediate the forward harrow sections.

The draft frame utilized in connection with the "wide type" harrow illustrated in Figs. 4 and 15, is similar in construction to the A frame structure described, but is of the rigid type. In this frame, the spreader bar 42a comprises a channel section which is attached at its ends to the draft members 41a, which constitute the sides of the frame, by vertically extending pins 217. Connecting members 219, pivoted from each of the pins 217, connect the harrow frames 25b to the junction of the spreader bar 42a and the draft members 41a.

Because the harrow sections are extremely long, the attainment of good leveling action during the operation of a conventional "wide type" harrow in an uneven field has been difficult. The draft frame construction of Figs. 4 and 15 includes means which is particularly effective in accomplishing this desired leveling action. The rigid spreader bar 42a is, in itself, a leveling plate. A leveling yoke 221, including a web section 223 and a transversely extending arm section 225, is disposed within the slot defined by the angle members 35a, which constitute the tongue 33a. The arm section 225 extends outwardly and engages the control bars 53a. The web portion 223 is pivotally attached, at its forward end, between the angle members 35a, by means of a transversely extending bolt 227. A leveling screw 229 extends downwardly through holes provided in the leveling plate 42a and the arm portion 225 of the leveling yoke 221; stop nuts 231 are provided to support the arm 225. A threaded insert 233 is integrally attached to the leveling bar 42a, and a lock nut 235 is provided to hold the leveling screw 229 in the desired position.

Through the adjustment permitted by the leveling screw 229, the yoke 221 and its associated arms 225, which engage the control bars 53a, may be raised or lowered to control downward movement of the control bars 53a, by either retracting or extending the screw 229. Thus, the downward movements of the center portions of the harrow are equalized in a manner similar to the equalizing effect of the leveling plate on upward movements of the center portions.

In the foregoing, novel structural arrangements have been disclosed which provide improved angling control linkages for multiple section disc harrows, and improved draft frame constructions for multiple harrows in tandem arrangements. The construction of the frame provides a positive leveling effect on both front and rear gangs, and a resilient structure which absorbs substantially all of the end thrust of the gangs.

This application is a division of my copending application, Serial No. 719,505, filed December 31, 1946, now Patent No. 2,663,132, issued December 22, 1953, and entitled "Disc Harrow."

The features of my invention that are believed to be new are expressly set forth in the appended claims.

I claim:

1. In a tandem harrow having sections adapted to be angled with respect to the line of draft of said harrow, the combination of a pair of forward harrow sections, a pair of rear harrow sections, a draft frame for connecting said forward harrow sections to a draft vehicle, angle selector means on said draft frame, adjustable angling mechanism supported upon said frame, and linkage means controlled by said selector means intermediate said selector means and said mechanism, said linkage means including a sliding assembly supported upon said draft frame, and means for drawing said rear harrow sections and for controlling the angularity thereof, said means including an A-shaped frame, the end of each of the side members of said A frame being connected to the outer portion of one of said rear harrow sections, a tongue connecting the apex of said A frame with said sliding assembly, and a pull bar connecting the inner portion of each of said rear harrow sections with the outer portion of the corresponding forward harrow section, whereby said rear harrow sections are angled simultaneously with said forward harrow sections in response to movement of said sliding assembly.

2. In a tandem harrow having sections adapted to be angled with respect to the line of draft of said harrow, the combination of a pair of forward harrow sections, a pair of rear harrow sections, a draft frame for connecting said forward harrow sections to a draft vehicle, a sliding assembly connected with the inner portion of said forward harrow sections and supported on said draft frame, and means for drawing said rear harrow sections and for controlling the angularity thereof, said means including an A-shaped frame, the end of each of the side members of said A frame being connected to the outer portion of one of said rear harrow sections, a tongue connecting the apex of said A frame with said sliding assembly, and a pull bar connecting the inner portion of each of said rear harrow sections with the outer portion of the corresponding forward harrow section, said pull bars being disposed above the side members of said A frame to restrain the latter against upward movement as the outer portion of the rear harrow sections tend to rise as the harrow is being pulled through the soil, and means for vertically adjusting the apex of said A frame to selectively vary the depth of cut of said rear harrow sections.

3. In a tandem harrow having sections adapted to be angled with respect to the line of draft of said harrow, the combination of a pair of forward harrow sections, a pair of rear harrow sections, a draft frame for connecting said forward harrow sections to a draft vehicle, a sliding assembly supported on said draft frame and connected with the inner portions of said forward harrow sections, and means for drawing said rear harrow sections and for controlling the angularity thereof, said means including an A-shaped frame, the end of each of the side members of said A frame being connected to the outer portion of one of said rear harrow sections, a rearwardly extending tongue connected at its forward end to said sliding assembly and being connected at the rearward end to a universal joint which is connected to the apex of said A frame, a pull bar connecting the inner portion of each of said rear harrow sections with the outer portion of the corresponding forward harrow section, said pull bars being disposed above the side members of said A frame to restrain the latter and thereby exert a downward force on the outer portions of said rear harrow sections, and means including a U-shaped strap adjustably supported at predetermined heights on said forward harrow sections for vertically adjusting said tongue to thereby determine the depth of cut of said rear harrow sections, said A frame and said pull bars thereby coacting to maintain a level depth of cut across the width of said harrow sections.

4. In a harrow of the class described, harrow sections adapted to be angled in respect to the line of draft of the said harrow, an A-shaped draft frame for connecting said harrow sections to a draft vehicle, means on said draft frame for angling said harrow sections, said draft frame including a longitudinally extending tongue member, side members extending outwardly and rearwardly from said tongue member to a hinged connection on the outer portion of each of said harrow sections, and a resilient member having spring-like characteristics and transversely disposed in relation to the line of draft of said harrows and connecting rearward portions of said side members, said resilient member being adapted to resist forces, normal to the line of draft of said harrow, which tend to move the inner ends of said harrow sections into engagement with each other.

5. In a harrow of the class described, harrow sections adapted to be angled in respect to the line of draft of the said harrow, an A-shaped draft frame for connecting said harrow sections to a draft vehicle, means on said draft frame for angling said harrow sections, said draft frame including a longitudinally extending tongue member, side members hingedly connected to said tongue member and extending outwardly and rearwardly from said tongue member to a hinged connection on the outer portion of each of said harrow sections, and a resilient member having spring-like characteristics and transversely disposed in relation to the line of draft of said harrow connected at its center to said tongue and connected at its ends to said side members by a floating connection, said resilient member being adapted to resist forces, normal to the line of draft of said harrow, which result from the operation of said harrow sections in an angled position.

6. In a harrow of the class described, harrow sections adapted to be angled in respect to the line of draft of the said harrow, an A-shaped draft frame for connecting said harrow sections to a draft vehicle, means on said draft frame for angling said harrow sections, said draft frame including a longitudinally extending tongue member, side members hingedly connected to said tongue member and extending outwardly and rearwardly from said tongue member to a hinged connection on the outer portion of each of said harrow sections, and a resilient member having spring-like characteristics and transversely disposed in relation to the line of draft of said harrow connected at its center to said tongue and connected at its ends to said side members by a floating connection, said connection between the ends of said resilient member and said side members comprising a bearing portion on each end of said resilient member, each of which bearing portion is adapted to fit loosely within a bracket rigidly attached to said side members, said resilient member being adapted to resist forces transversely of the line of draft of said harrow and toward said line of draft, which result from the operation of said harrow sections in an angled position.

7. In a tandem harrow having sections adapted to be angled with respect to the line of draft of said harrow, the combination of a pair of forward harrow sections, a pair of rear harrow sections, means interconnecting the inner ends of said forward harrow sections for relative movement about spaced-apart pivot axes, a draft frame for connecting said forward harrow sections to a draft vehicle, a sliding assembly carried by said draft frame, separate means connecting the inner end of each of the forward harrow sections with said sliding assembly for movement therewith, angle selector means interconnecting said draft frame and sliding assembly for controlling the angularity of said forward harrow sections, and means for drawing said rear harrow sections and for controlling the angularity thereof, said latter means including an A-shaped frame having the end of each of the side members thereof connected to an outer portion of one of said rear harrow sections, a tongue connecting the apex of said A-shaped frame with said sliding assembly for movement therewith relative to said draft frame and with respect to the inner ends of said forward harrow sections, and a pull bar connecting the inner portion of each of said rear harrow sections with an outer portion of the corresponding forward harrow section, whereby said rear harrow sections are angled simultaneously with said forward harrow sections in response to movement of said sliding assembly.

References Cited in the file of this patent

UNITED STATES PATENTS

| | | |
|---|---|---|
| 1,081,918 | Waterman | Dec. 16, 1913 |
| 1,619,857 | Dewend | Mar. 8, 1927 |
| 1,621,622 | Brenneis | Mar. 22, 1927 |
| 1,718,796 | Mowry | June 25, 1929 |
| 1,846,663 | White | Feb. 23, 1932 |
| 2,325,855 | Hornish | Aug. 3, 1943 |